United States Patent

Shigapov et al.

Patent Number: 6,139,814
Date of Patent: Oct. 31, 2000

[54] THERMALLY STABLE, HIGH-SURFACE-AREA METAL OXIDES MADE BY ORGANIC TEMPLATING

[75] Inventors: Albert Nazipovich Shigapov, Krasnoyarsk, Russian Federation; George Wade Graham, Ann Arbor; Robert Walter McCabe, Lathrup Village, both of Mich.

[73] Assignee: Ford Global Technologies, Inc., Dearborn, Mich.

[21] Appl. No.: 08/966,729

[22] Filed: Nov. 10, 1997

[51] Int. Cl.$^7$ ..................................................... C01B 13/14
[52] U.S. Cl. ........................... 423/592; 423/608; 423/635; 502/300; 502/302; 502/303; 502/304; 502/325; 502/326; 502/328; 502/340; 502/349
[58] Field of Search ...................................... 423/592, 593, 423/594, 598, 606, 608; 264/413, 414, 628, 629, 630; 502/300, 302, 303, 304, 325, 326, 328, 340, 349

[56] References Cited

U.S. PATENT DOCUMENTS

| | | | |
|---|---|---|---|
| 1,783,396 | 12/1930 | Travers et al. | |
| 3,533,964 | 10/1970 | Rochow. | |
| 4,113,651 | 9/1978 | Chornet et al. | |
| 4,169,874 | 10/1979 | Bambrick | 264/44 |
| 4,277,376 | 7/1981 | Paolasini. | |
| 4,353,854 | 10/1982 | Oyamada et al. | 264/63 |
| 4,925,647 | 5/1990 | Kirchhofer | 423/592 |
| 5,081,102 | 1/1992 | Gay et al. | 505/1 |
| 5,169,300 | 12/1992 | Chou et al. | 431/7 |
| 5,183,608 | 2/1993 | Guile | 264/66 |
| 5,310,525 | 5/1994 | Churchouse et al. | 422/56 |
| 5,358,695 | 10/1994 | Helble et al. | 423/592 |
| 5,468,266 | 11/1995 | Bensalem et al. | 44/542 |
| 5,468,427 | 11/1995 | Stangle et al. | 264/3.4 |
| 5,505,865 | 4/1996 | Kumar et al. | 252/62.62 |
| 5,568,652 | 10/1996 | Wu | 419/2 |
| 5,595,577 | 1/1997 | Bensalem et al. | 44/629 |
| 5,630,974 | 5/1997 | Rose et al. | 264/105 |
| 5,635,154 | 6/1997 | Arai et al. | 423/592 |

OTHER PUBLICATIONS

CA Selects Plus: Catalysis (Applied & Physical Aspects) Issue 9, 1997, p. 38, 1997: 259239 Manufacture of cerium–zirconium oxide solid–solution with high reproducibility by decreased number of processes for exhaust gas purifying catalyst.

Primary Examiner—Tom Dunn
Assistant Examiner—Cam N. Nguyen
Attorney, Agent, or Firm—Lorraine S. Melotik

[57] ABSTRACT

The invention is a method for producing a metal oxide product by steps including absorbing a liquid solution of metal oxide precursors onto crystalline or microcrystalline, porous structured organic material capable of being combusted at elevated temperatures; heating the organic material containing the absorbed solution for a time and at a temperature sufficient to vaporize the liquid, convert the metal oxide precursors to metal oxides, and combust the organic material. The metal oxide products have been found to retain a high specific surface area (porous structure) even when subjected to elevated temperatures, which makes them ideally suited for use as catalyst materials.

10 Claims, 2 Drawing Sheets

THERMALLY STABLE, HIGH-SURFACE-AREA METAL OXIDES MADE BY ORGANIC TEMPLATING

FIELD OF THE INVENTION

The invention relates to a method of making metal oxides by absorbing metal oxide precursors into a structured porous organic template material such as filter paper which is then combusted leaving metal oxides. The metal oxides are useful as catalyst materials.

BACKGROUND OF THE INVENTION

Metal oxides, more generally termed ceramic oxides, are typically made by high-temperature processes, such as kiln-firing. The resultant materials are very dense and possess specific surface areas well below 1 $m^2/g$. Certain applications, such as catalysis and adsorption, require metal oxides which have higher surface areas, i.e., 10 $m^2/g$ or higher. While many techniques exist to produce such high surface area materials (e.g., precipitation methods, sol-gel techniques, spray pyrolysis, etc.), all are limited in their ability to produce support materials which retain their high surface area after extended thermal treatments at temperatures in excess of 1050° C. Automotive exhaust catalysts, in particular, require metal oxide support materials for both the active noble metals and other metal additives. Typically metal oxides such as ceria, or ceria mixed with other oxides such as zirconia, praseodymia, and lanthana, are also used in automotive catalyst supports as oxygen storage components because of their ability to supply oxygen for converting pollutant species such as carbon monoxide and hydrocarbons through a cyclic reduction-oxidation process. Historically, it has been very difficult to prepare such mixed oxides which retain >10 $m^2/g$ BET surface area after extended aging in automotive exhaust-type gas mixtures at temperatures of 1050° C. or higher for extended periods of time (10 hours or more). High specific surface area is a desirable property for materials such as adsorbents and catalysts because of the dependence of these processes on interfacial contact area between the metal oxide and the gas or liquid phase in contact. In automotive catalysis, the metal oxide support phases also have the desirable characteristic of aiding in the dispersion of the active noble metals as very small particles (typically 5 nm or less when fresh). However, automotive catalysts are often subjected to very high operating temperatures which, over time, result in growth (i.e., sintering) of both the noble metals and the underlying metal oxide support phase with concomitant loss of surface area. Similarly, the property of oxygen storage, which is a cooperative phenomenon between the reducible metal oxide and the noble metals, also decreases dramatically upon sintering of the noble metal and metal oxide materials. Consequently, it is desirable to produce metal oxide materials, suitable as both support phases and oxygen storage agents, which can be used in automotive exhaust and other catalytic applications where temperatures can exceed 1050° C., without the surface area decreasing to levels below 10 $m^2/g$, and more preferably, retaining surface area ca 20 $m^2/g$ or higher. Additionally, for automotive catalysis, it is desirable to produce supporting oxides with a pore structure largely in the mesoporous regime. This mid-size pore range allows for easy access of the reacting gases to the catalyst surface, yet the pores are still small enough that substantial surface area is retained. The present invention has been found to meet those objectives through the use of crystalline or microcrystalline, structured porous organic templating materials which impart desirable thermal stability and porosity to the resultant metal oxide powders.

SUMMARY OF THE INVENTION

This invention is a method for making thermally-stable, high-surface-area, metal oxide materials, the steps of the method comprising: absorbing a liquid solution of metal oxide precursors onto a crystalline or microcrystalline, structured porous organic material capable of being combusted at elevated temperatures; heating the material containing the absorbed solution for a time and at a temperature sufficient to vaporize the liquid, convert the metal oxide precursors to metal oxides, and combust the organic templating material. The organic material is preferably a cellulose material having an average pore volume in the mesoporous range.

Metal oxide powders of the present invention advantageously have been shown to retain high specific surface area even after thermal treatments at approximately 1000° C. or higher. Such powders are useful as high surface area catalyst materials, particularly as supporting phases for noble metals.

Another embodiment is a metal oxide material made, in whole or in part, from the resultant oxides prepared by the combustible structured organic material templating method disclosed above.

DETAILED DESCRIPTION OF PREFERRED EMBODIMENTS

Figure 3:
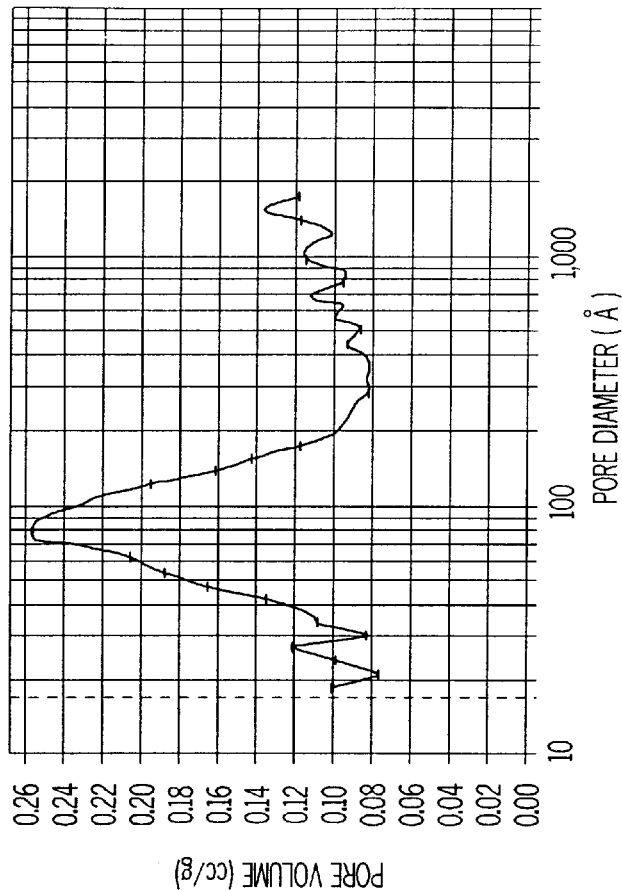
FIG. 3 is a graph of pore volume vs pore diameter for a mixed oxide of praseodymia, ceria, and zirconia prepared according to an embodiment of the present invention.

The invention is a process for preparing thermally-stable, high-surface-area metal oxide materials using a unique templating method, where the template is a porous structured organic material with a well-defined crystallinity or microcrystallinity. By "structured" is meant a well-defined pore structure which optimally, is relatively homogeneous throughout the organic material. It is believed that the method works to produce a porous metal oxide somewhat like a cast is made from a mold. That is, the organic template serves as the mold and the porosity of the template material helps determine the ultimate structure of the resulting metal oxide. The mold (i.e., pores of the organic template) is contacted with a liquid solution of metal salts or organometallic compounds that optimally essentially fill the pores, acting as the cast material. Subsequent heating then vaporizes and removes the liquid, leaving the metal oxide precursors adsorbed on the surface of the mold (i.e., the porous organic template material), and then further heating in air or some other gas containing oxygen at high temperatures combusts the mold while also converting the metal oxide precursors to their respective metal oxides.

A surprising and unexpected advantage of the present invention method is that the resultant metal oxides so produced have been found to have extremely good thermal stability. Commonly used present techniques for making porous metal oxides like colloidal methods, sol-gel methods, and molecular templating techniques are capable of producing materials with comparable, or even greater, surface area at low temperatures. However, the current invention is unique in its ability to produce materials with surface areas 2–3 times greater than those obtained by competing processes after heating in air or redox environments at temperatures of 1050° C. for extended times (>10 hours). That is, the present invention metal oxides retain their pore structure and hence surface area at elevated temperatures which is a desirable and critical property for use as catalyst supports. Although the reason for this unexpected thermal stability is not known for certain, broad experimentation with many different types of templating materials suggests that the excellent thermal stability is owed, in large part, to selection of organic templating materials which have a well-defined pore structure, optimally those with a predominance of pore volume in the mesoporous range. We have unexpectedly found the metal oxide materials made by the present invention method utilizing metals disclosed herein such as cerium, zirconium, praseodymium, or their mixtures, retain BET surface area in excess of 55 $m^2/g$ after air-calcination for 2 hours at 800° C. and in excess of 15 $m^2/g$ after air-calcination for 12 hours at 1050° C.

According to the present invention, suitable metal oxide precursors of the desired metal oxide or mixed oxide are first selected and dissolved in solution. The solution is thereafter provided on the templating material through absorption of the solution. The metal oxide precursors may be selected from any precursor which will provide a metal or a metal compound on the templating material, which metal or compound is capable of converting to its metal oxide during the subsequent heating of the template material. The metals can be supplied via any salts that are soluble in the solvent. Nitrates are particularly suitable since they generally show good solubility in aqueous solution. Other common precursors which have been successfully used include organic salts such as citrates and acetylacetonates of the metal. The metal may be any metal and includes, e.g., but is not limited to, cerium, lanthanum, praseodymium, zirconium, and virtually all of the elements of the alkaline earth, transition metal, and lanthanide metal series of the periodic table, and mixtures of any such metals. Hence, such precursors may be, e.g., inorganic metal salts or organic metal complexes like cerium, aluminum, and zirconium nitrate, zirconium (IV) acetylacetonate, and zirconium (IV) citrate. Still other metal oxide precursors will be apparent to those skilled in the art in view of the present disclosure. It is particularly desired to manufacture oxides of metals like cerium and zirconium according to the present invention if the resultant metal oxides are to be used as catalyst supports. The metal oxides of the present invention may be used, however, as other than a catalyst support, for example, as adsorbent materials and high-temperature gettering materials. In such cases, the metal oxide may also be selected from a broad range of alkaline earth, transition, or lanthanide elements.

The solvent can be any liquid which is capable of both dissolving the metal precursors and being absorbed by the organic template material. Although organic solvents, such as alcohols, ethers, and ketones can be used, water is the most convenient and preferred solvent. Even in cases where the metal precursors have limited solubility in water, it is often possible to increase solubility through the addition of citric acid to the aqueous solution of metal salts. The citric acid reacts with the metal salts to form citrate complexes which have a high solubility in water. This allows the preparation of mixed oxide materials from more highly concentrated solutions of metal salts than would otherwise be possible. Another method for improving the solubility of precursor salts is to heat the solution to between 50–100° C., preferably to about 75–80° C. It should also be noted that the technique works best in either acidic or neutral mediums.

Figure 1:
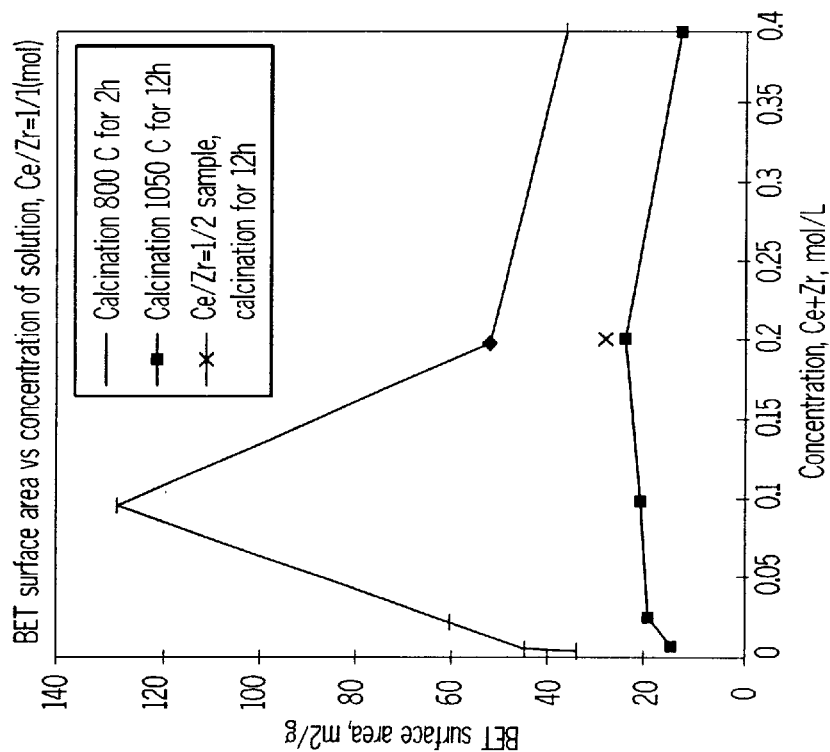
FIG. 1 is a graph which shows the effect of the concentration of cerium and zirconium in aqueous solution on the specific surface area of resulting mixed oxides produced according to embodiments of the present invention.

The graph in FIG. 1 shows that the concentration of metal salts in the starting solution can be widely varied while still producing materials with high surface area and excellent thermal stability. The plot shows BET surface area data (as measured by the method of Brunauer, Emmett, and Teller, BET) for a series of 50%—50% (i.e., 1/1 mol ratio) ceria-zirconia materials, prepared from different concentrations of Ce+Zr salts in aqueous solution. In these examples, Whatman 50 filter paper was used as the templating medium. The surface areas were measured both after aging at 800° C. for 2 hours (upper curve) and 1050° C. for 12 hours (lower curve). The data point indicated by the symbol X is for a mixed oxide in which the mole ratio of Ce to Zr is 1 to 2. As expected, the more severe aging treatment results in significant loss of surface area (from a range of 34–129 $m^2/g$ for the fresh materials to 12–24 $m^2/g$ for the aged materials). The optimum salt concentration for these particular salts to produce high surface area oxides occurs at about 0.2 mol/l (M). In general, the concentrations of such metal salts can be varied from 0.001 M to 1 M but the best results are obtained for 0.1–0.4 M solutions. It is expected that these concentrations would also be optimal to produce high surface area oxides with other salts. Once a suitable solution of metal precursors has been prepared, the next step, according to the present invention, is to contact the solution with the organic template material. The impregnation of the template material by the salt-containing solution is usually carried out with the maximum amount of solution that can be completely absorbed. As such, the technique is similar to methods of catalyst impregnation that utilize the so-called "incipient wetness" or "minimum volume" techniques where the amount of solution is just sufficient to completely fill the catalyst pores without leaving excess free solution. Analogously, here the optimal amount of solution is that which is just sufficient to fill the capillaries in the organic medium. In the case of a cellulose-based template, such as a filter paper, the ideal amount of solution is that which completely wets the paper without leaving excess free liquid on the surface of the paper. One advantage of working with cellulose is that it imbibes the liquid; thus no special care is required to ensure uniform contact of the solution with the cellulose. Most of the materials prepared in the present invention were made simply by immersing the template medium (e.g., layered sheets of filter paper) in a shallow glass dish containing the impregnating solution.

The choice of organic template material in this invention is extremely important since we have found it greatly affects the ultimate structure and stability of the resultant metal oxides. Many materials have been tested in the course of the present invention, including polyurethane foam, organic surfactants, activated carbons, and many types of cellulose materials including various types of paper, natural materials such as cotton and starch, and various cellulose derivatives such as cellulose powder, colloidal cellulose and cellulose compounds. Of these materials, excellent results have been obtained with highly processed cellulose materials of high purity and well-defined pore structure showing a high degree of crystallinity or microcrystallinity. This is in contrast to amorphous materials such as various molecular cellulose derivatives including cellulose acetate, colloidal cellulose, and natural cellulose containing materials such as starch and cotton which are unsuitable in the present invention because they do not have a well-defined pore structure. Table 1 contains a list of various cellulose-containing materials which have been used as templates for making ceria-zirconia mixed oxides, as disclosed above, and the corresponding BET weight-specific surface areas ($m^2/g$) obtained with each after calcining in air at 800° C. for 2 hours or at 1050° C. for 12 hours. As can be seen from the table, the best results have been obtained with a Whatman 50 filter paper. Filter paper also has high purity (0.007–0.06% ash) which is a desirable property, as the ash left behind will generally be incorporated into the resulting oxide in a much more concentrated form after combustion of the paper. While this may affect the purity of the final product, the desirable high surface area properties of the products are maintained.

TABLE 1

| Template Material | BET area ($m^2/g$), T = 800° C. for 2hours | BET area, ($m^2/g$) T = 1050° C. for 12hours |
| --- | --- | --- |
| 1. Whatman 50 filter paper | 129 | 30 |
| 2. Cellulose microcrystalline powder | 88 | 25 |
| 3. Chromatography 17 paper | 56 | 22 |
| 4. Regenerated cellulose | 72 | 15 |
| 5. Weighing paper | 52 | 11 |
| 6. Cotton adsorbent | 45 | 8 |
| 7. Cellulose nitrate | 44 | |
| 8. Cellulose colloidal | 12 | |
| 9. Cellulose acetate | 11 | |

Next, according to the present invention, the organic template containing the absorbed solution of metal precursors, is heated to remove excess liquid, combust the organic template and convert the metal salts to their respective oxides. Generally, although not necessarily, this is carried out in two distinct steps—a drying step and a combustion step. Drying can be carried out at any temperature preferably being below the boiling point of the solvent. In the case of cellulose templates, it is desirable to dry at temperatures below 100° C. to avoid decomposing the cellulose structure while large quantities of water remain in the structure. Most often drying is carried out at room temperature and can be accelerated by flowing dry air over the sample. The exact conditions of drying have not been found to have a significant affect on the properties of the final product.

The combustion step is carried out in air at a temperature which is sufficient to combust the organic template material while converting the metal salts to their respective oxides. Generally, 500° C. is the minimum temperature at which this can be accomplished in a reasonable period of time. A temperature of 600° C. has been found to result in efficient combustion of most organic materials and complete conversion of the precursor metal salts to metal oxides while producing materials with excellent thermal stability. Generally, the material, after drying, is heated to the combustion temperature, at a controlled rate and then held at the combustion temperature for sufficient time to ensure complete reaction. The exact rates of temperature ramping and dwell-time at the combustion temperature are not critical and can be varied widely. Most of the materials formed in the course of this invention involved heating at a rate of 10° C./min and maintaining the combustion temperature for a period of about two hours. It should be noted that the steps of converting the metal salts to their respective oxides and combusting the underlying template material occur, more or less simultaneously, the specific order depending on the ease of combustion of the template material and the stability of the metal precursors. It has not been found necessary to the present invention to effect one process before the other, and both processes occur during the period referred to as the combustion step.

After the combustion step, the synthesis of the oxide materials according to the essential steps of the invention is essentially complete. Materials thus obtained generally have the form of thin flakes which can be further processed, e.g., by grinding or ball-milling, to form fine powders. Also, the materials can be impregnated with other metals. In the preferred embodiment as a component of automotive exhaust catalysts, the material could be ground to a fine powder (1–10 $\mu$m in diameter) and coated with salts of noble metals, usually from the group of platinum, palladium, and rhodium. Other surface additives from the transition element series, alkaline earth element series, or rare earth element series might also be added to further promote thermal stability, catalytic activity, and oxygen storage capacity, in combinations familiar to those skilled in the art. Such components of three-way automotive catalysts are particularly suitable for use in catalytic converters which experience very high temperatures during use, and consequently, require extremely good thermal stability. Examples of such applications are so-called "close-coupled" catalytic converters mounted at the outlet of the exhaust manifold, converters on heavy duty trucks, and converters on cars that are run under so-called $\lambda=1$ fueling conditions (where no catalyst cooling via injection of excess fuel is employed).

Conventional methods of producing metal oxides include techniques such as precipitation (or co-precipitation) of metal salts from solution, or direct decomposition of hydrated nitrate salts. These techniques generally produce low-surface-area, dense oxide powders which usually require additional processing steps such as washing and filtration. The approach of the present invention retains the simplicity of the conventional techniques but produces material of much higher surface area. Other methods are available for producing high-surface-area metal oxides. These include sol-gel, spray pyrolysis, and molecular templating approaches. However, each has disadvantages compared to the present invention, and none was found by us to be capable of producing materials with equivalent thermal stability to that achieved with the present invention. For example, molecular templating generally requires synthesis of expensive and complex organic compounds as directing agents. Sol-gel methods require an additional precipitation step as well as the use of complex organic salts of the metal oxide precursor. Especially for mixed oxide materials, the organic templating method of the present invention avoids the problems of non-simultaneous precipitation, and subsequent segregation, of the individual components which is often problematic with other techniques.

The present invention technique is also quite versatile as to the range of mixed oxide compositions which can be produced. Table 2 summarizes BET surface area data after two severity levels of aging for a series of ceria-zirconia oxides, made according to the present invention method, ranging in composition from pure ceria to pure zirconia. All of the samples were made using Whatman 50 filter paper following the general procedure of Example 4 (with salt concentrations varied accordingly), the only exception being the 50/50 sample which was made according to Example 5. With the exception of the pure zirconia, all materials retained surface area between 17 and 28 $m^2/g$ after 12 hours (1050° C.) air-aging. In contrast, cerium/zirconia metal oxide materials obtained from commercial sources, prepared by the supplier by undisclosed methods, yield surface areas between 8 and 13 m²/g after equivalent aging.

TABLE 2

| Ce/Zr mole ratio | BET area (m²/g); 800° C./2 hours | BET area (m²/g); 1050° C./12 hours |
|---|---|---|
| 100/0 | 55 | 17 |
| 60/40 | 56 | 19 |
| 50/50 | 129 | 22 |
| 50/50 (Example 5) | 55 | 30 |
| 40/60 | 63 | 23 |
| 33/67 | 100 | 28 |
| 0/100 | 55 | 7 |
| 60/40 (Commercial) | | 8 |
| 60/40 (Commercial) | | 10 |
| 10/90 (Commercial) | | 13 |

Figure 2:
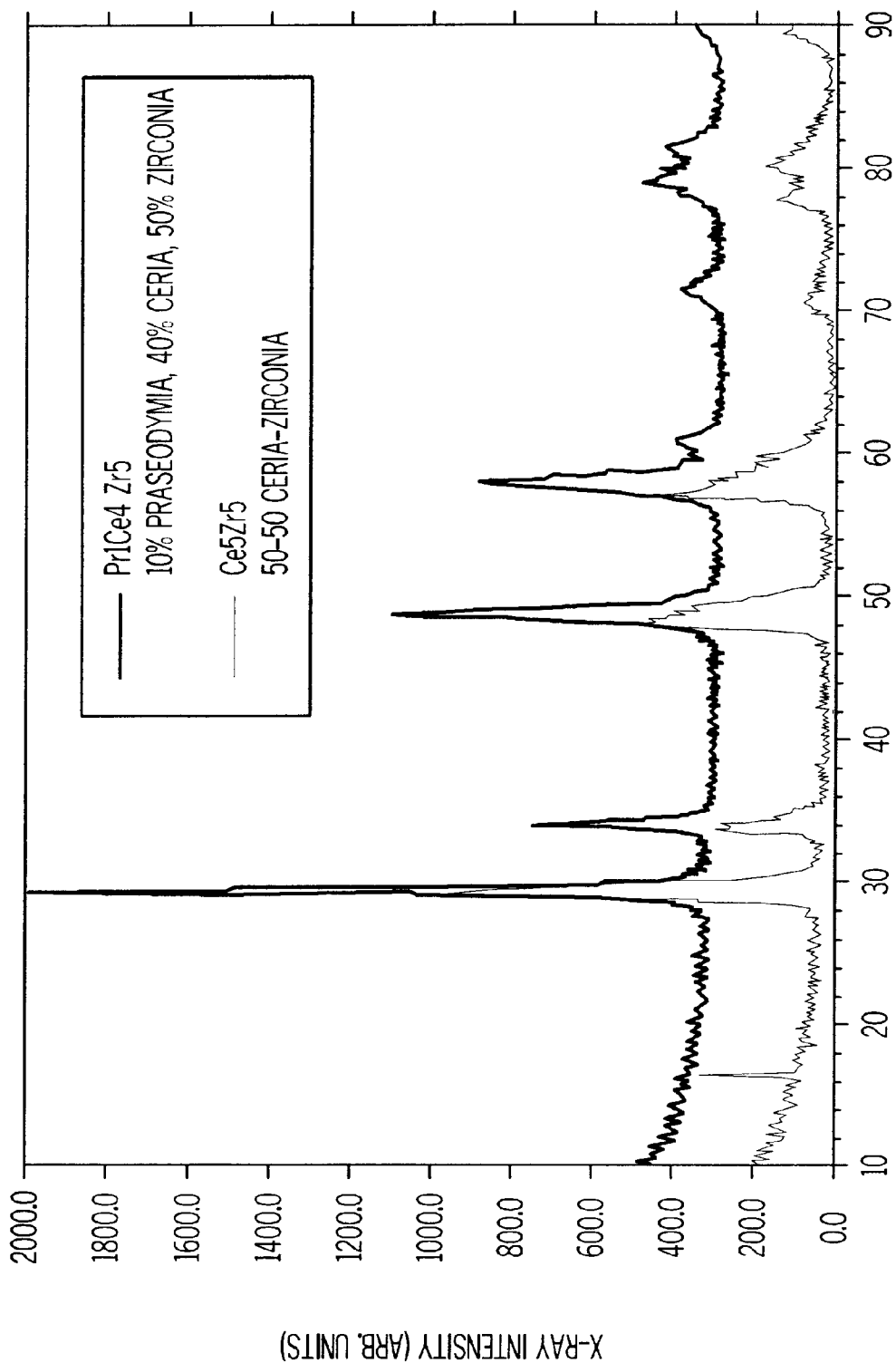
FIG. 2 is an X-ray diffraction scan for two metal oxide materials prepared according to embodiments of the present invention.

In addition to excellent thermal stability, the mixed oxide materials prepared by the present invention organic templating technique also show good homogeneity. FIG. 2 shows X-ray diffraction patterns obtained for two compositions of mixed oxide materials prepared by the cellulose templating method after aging at 1050° C. for two hours in air. Both materials exhibit predominantly a single phase fluorite structure as evidenced by the presence of one peak (rather than two or more closely spaced peaks) at each diffraction angle. The lower trace (for a 1-to-1 mole ratio ceria-zirconia mixed oxide) shows some evidence for phase segregation by a broadening and skewing of the peaks (shoulder on the high-angle side of each peak). However, the ternary oxide of the upper trace (1 part Pr-4 part Ce-5 part Zr mole ratio) shows no evidence for segregation of the mixed oxide into a mixture of separate oxide materials.

Another advantage of the present invention is that the invention method can be carried out with the complete absence of any liquid or solid wastes during synthesis. The starting solution and salts can be completely utilized without the formation of solid by-products. Also, when aqueous solutions are used, as is typically the case, no organic vapors are produced during the drying and combustion steps.

Although not wishing to be bound by theory, the particular advantages of the organic templating method of the present invention, compared to alternative methods, appear to be related to the structure of the template material. Using cellulose as an example, crystalline or micro-crystalline cellulose has a fibrous structure with channels, i.e. capillaries, of nanometer scale inside the fibers. The metal salt solution fills the capillaries and, after drying and subsequent combustion of the cellulose, forms a metal oxide material characterized by a pore distribution sharply peaked in the mesoporous range between 7 and 20 nm as shown in FIG. 3 (pore volume vs pore diameter) for a mixed oxide of ceria, zirconia and praseodymia. Thus the cellulose serves as a template, or scaffold, for concentrating and aligning the metal salts, and is burned away during the process of converting the metal salts to their respective oxides. In contrast, other methods for preparing high-surface-area metal oxides, such as sol-gel, spray pyrolysis, and molecular templating techniques, produce materials that are microporous (pore sizes largely below 4 nm). Although high-purity crystalline or micro-crystalline cellulose, such as found in filter paper, chromatography paper and microcrystalline cellulose powder, is the preferred templating medium in the present invention, it should be apparent that the method is broadly applicable to any solid material which absorbs liquid solutions and can be combusted or decomposed at elevated temperatures, optimally above those at which metal oxides are formed from their corresponding salts. Generally, this requires a minimum temperature of about 500° C. and a maximum temperature of about 1000° C. (above which the metal oxide particles may undergo significant coalescence before the matrix material combusts or decomposes). For most organic materials, the combustion temperature range of 550–700° C. is optimal.

The BET test results for metal oxides made according to embodiments of the present invention (Examples below) are shown in Table 3.

EXAMPLE 1

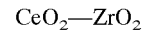
$CeO_2$—$ZrO_2$ 66 g of Whatman 542 filter paper was added to 100 ml of solution containing 1.085 g of $Ce(NO_3)_3 6H_2O$ (Johnson Matthey), 1.76 g of zirconium (IV) citrate, ammonium complex (Aldrich), 5.0 g of citric acid, anhydrous (Acros Organics) in distilled water at room temperature, then the filter paper was dried at room temperature and combusted at 585° C. for 3 hours in air to burn out the paper. The prepared material was calcined at 800° C. for 2 hours and then at 1050° C. for 12 hours to evaluate its thermal stability. The formation of single fluorite phase was identified by XRD analysis.

EXAMPLE 2

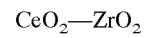
$CeO_2$—$ZrO_2$ 62 g of cellulose microcrystalline powder, 20 micron (Aldrich) was mixed with 100 ml of solution described in Example 1. Other preparation procedures are the same as in Example 1.

EXAMPLE 3

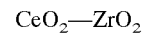
$CeO_2$—$ZrO_2$ 43 g of Whatman 542 filter paper was added to 70 ml of solution containing 1.27 g of $Ce(NO_3)_3 6H_2O$ (Johnson Matthey) and 5.32 g of 5% solution of zirconium dinitrate oxide (Johnson Matthey). Other preparation procedures are the same as in Example 1.

EXAMPLE 4

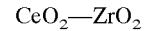
$CeO_2$—$ZrO_2$ 30 g of Whatman 50 filter paper was added to 50 ml of solution containing 2.17 g of $Ce(NO_3)_3 6H_2O$ (Johnson Matthey), 1.76 g of zirconium (IV) citrate, ammonium complex (Aldrich), 3.0 g of citric acid, anhydrous (Acros Organics) at room temperature, the filter paper was dried overnight at room temperature and combusted at 600° C. for 2 hours. Other temperature treatments are the same as described in Example 1.

EXAMPLE 5

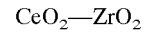
$CeO_2$—$ZrO_2$ 58 g of Whatman 50 filter paper was added to 100 ml of hot solution (80° C.) containing 10.9 g of $Ce(NO_3)_3 6H_2O$ (Johnson Matthey), 12.2 g of zirconium (IV) acetylacetonate (Aldrich), and 25.0 g of citric acid, anhydrous (Acros Organics). The filter paper was dried at 85° C. for 1 hour and combusted at 600° C. for 2 hours. The prepared material was calcined at 800° C. for 2 hours and then at 1050° C. for 12 hours to evaluate thermal stability.

EXAMPLE 6

$CeO_2$—$ZrO_2$ 22 g of Chromatography 17 paper (Fisher) was added to 50 ml of solution containing 2.17 g of $Ce(NO_3)_3 6H_2O$ (Johnson Matthey), 1.76 g of zirconium (IV) citrate, ammonium complex (Aldrich), 5.0 g of citric acid, anhydrous (Acros Organics). Other preparation procedures are the same as in Example 4.

EXAMPLE 7

$CeO_2$ 30 g of Whatman 50 filter paper was added to 50 ml of solution containing 4.34 g of $Ce(NO_3)_3 6H_2O$ (Johnson Matthey) and 5.0 g of citric acid. Other procedures are the same as in Example 4.

EXAMPLE 8

MgO 31 g of Whatman 50 filter paper was added to 50 ml of solution containing 6.12 g of $Mg(NO_3)_2 4H_2O$ (Alfa) and 15 g of citric acid. Other procedures are as for Example 4.

EXAMPLE 9

$Al_2O_3$ 37 g of Whatman 50 filter paper was added to 50 ml of solution containing 11.25 g of $Al(NO_3)_3 9H_2O$ (Alfa). Other procedures are the same as for Example 4. XRD analysis has shown the formation of gamma alumina.

EXAMPLE 10

$La_2O_3$—$Al_2O_2$ 32 g of Whatman 50 filter paper was added to 50 ml of solution containing 3.75 g of $Al(NO_3)_3 9H_2O$ (Alfa), 0.173 g of $La(NO_3)_3 6H_2O$ (Alfa), and 8 g of citric acid at room temperature. Wet paper (without preliminary drying) was combusted at 600° C. for 2 hours. Other thermal treatments are as in Example 1. XRD analysis has shown the formation of gamma alumina.

EXAMPLE 11

$La_2O_3$—$Al_2O_3$ 30 g of Whatman 50 filter paper was added to 50 ml of solution containing 11.25 g of $Al(NO_3)_3 9H_2O$ (Alfa) and 0.75 g of $La(NO_3)_3 6H_2O$ (Alfa) at room temperature. Other procedures are as for Example 4.

EXAMPLE 12

$La_2O_3$—$Al_2O_3$ 38 g of cellulose microcrystalline powder was mixed with 50 ml of the same solution as in Example 11. Other procedures are as for Example 4.

EXAMPLE 13

$PrO_x$—$CeO_2$—$ZrO_2$ 36 g of P2 filter paper (Fisher) was added to 50 ml of solution containing 1.31 g of $Ce(NO_3)_3 6H_2O$ (Johnson Matthey), 1.76 g of zirconium (IV) citrate, ammonium complex (Aldrich), 0.88 g of $Pr(NO_3)_3 6H_2O$ (Johnson Matthey), and 6.0 g of citric acid, anhydrous (Acros Organics). Other preparation procedures are the same as in Example 4. The formation of a single fluorite phase was detected by XRD analysis.

EXAMPLE 14

$PrO_x$—$CeO_2$—$ZrO_2$ 31 g of Whatman 50 filter paper was added to 50 ml of solution containing 0.80 g of $Ce(NO_3)_3 6H_2O$ (Johnson Matthey), 1.76 g of zirconium (IV) citrate, ammonium complex (Aldrich), 1.39 g of $Pr(NO_3)_3 6H_2O$ (Johnson Matthey), and 8.0 g of citric acid, anhydrous (Acros Organics). Other preparation procedures are the same as in Example 4.

EXAMPLE 15

$PrO_x$—$CeO_2$—$ZrO_2$ 234 g of Whatman 50 filter paper was added to 400 ml of solution containing 34.7 g of $Ce(NO_3)_3 6H_2O$ (Johnson Matthey), 42.3 g of $Pr(NO_3)_3 6H_2O$ (Johnson Matthey), and 120.0 g of ammonium citrate, (Aldrich). The wet paper was dried by a flow of air at room temperature for 2 hours. Other preparation procedures are the same as in Example 4.

EXAMPLE 16

CaO—$CeO_2$—$ZrO_2$ 25 g of Whatman 50 filter paper was added to 40 ml of solution containing 3.47 g of $Ce(NO_3)_3 6H_2O$ (Johnson Matthey), 4.88 g of zirconium (IV)acetylacetonate (Aldrich), 0.47 g of $Ca(NO_3)_2 4H_2O$ (Aldrich), and 8.0 g of citric acid, anhydrous (Acros Organics). Other preparation procedures are the same as for Example 4.

EXAMPLE 17

$Y_2O_3$—$CeO_2$—$ZrO_2$ 25 g of Whatman 50 filter paper was added to 40 ml of solution containing 3.47 g of $Ce(NO_3)_3 6H_2O$ (Johnson Matthey), 4.88 g of zirconium (IV) acetylacetonate (Aldrich), 0.77 g of $Y(NO_3)_3 6H_2O$ (Aldrich), and 8.0 g of citric acid, anhydrous (Acros Organics). Other preparation procedures are the same as in Example 4. The formation of a single fluorite phase was detected by XRD analysis.

EXAMPLE 18

$La_2O_3$—$CeO_2$—$ZrO_2$ 25 g of Whatman 50 filter paper was added to 40 ml of solution containing 3.47 g of $Ce(NO_3)_3 6H_2O$ (Johnson Matthey), 4.88 g of zirconium (IV) acetylacetonate (Aldrich), 0.77 g of $Y(NO_3)_3 6H_2O$ (Aldrich), and 8.0 g of citric acid, anhydrous (Acros Organics). Other preparation procedures are the same as in Example 4. The formation of a single fluorite phase was detected by XRD analysis.

TABLE 3

The mole ratio of the oxides of each composition are given in parentheses in the column labeled "composition".

| Composition | Cellulose Material | BET ($m^2/g$), 800° C./ 2hours | BET ($m^2/g$), 1050° C./ 12hours |
|---|---|---|---|
| 1. $CeO_2$—$ZrO_2$ (1/2) | Whatman 542 filter paper | 100 | 28 |
| 2. $CeO_2$—$ZrO_2$ (1/2) | Cellulose microcrystalline powder | 88 | 25 |
| 3. $CeO_2$—$ZrO_2$ (1/1) | Whatman 542 filter paper | 115 | 15 |
| 4. $CeO_2$—$ZrO_2$ (1/1) | Whatman 50 filter paper | 129 | 21 |
| 5. $CeO_2$—$ZrO_2$ (1/1) | Whatman 50 filter paper | 56 | 30 |
| 6. $CeO_2$—$ZrO_2$ (1/1) | Chromatography 17 paper | 56 | 22 |
| 7. $CeO_2$ | Whatman 50 filter paper | 55 | 17 |
| 8. MgO | Whatman 50 filter paper | 65 | 16 |
| 9. $Al_2O_3$ | Whatman 50 filter paper | 279 | 22 |
| 10. $La_2O_3$—$Al_2O_3$ (4 mol % La) | Whatman 50 filter paper | 250 | 109 |
| 11. $La_2O_3$—$Al_2O_3$ (5 mol % La) | Whatman 50 filter paper | 275 | 110 |
| 12. $La_2O_3$—$Al_2O_3$ (5 mol % La) | Cellulose microcrystalline powder | 266 | 86 |
| 13. $PrO_x$—$CeO_2$—$ZrO_2$ (2/3/5) | P2 filter paper | 61 | 35 |
| 14. $PrO_x$—$CeO_3$—$ZrO_2$ (3.2/1.8/5) | Whatman 50 filter paper | 74 | 31 |
| 15. $PrO_x$—$CeO_2$—$ZrO_2$ (2/2/3) | Whatman 50 filter paper | 67 | 23 |
| 16. CaO—$CeO_2$—$ZrO_2$ (1/4/5) | Whatman 50 filter paper | 108 | 21 |
| 17. $Y_2O_3$—$CeO_2$—$ZrO_2$ (1/4/5) | Whatman 50 filter paper | 149 | 21 |
| 18. $La_2O_3$—$CeO_3$—$ZrO_2$ (1/4/5) | Whatman 50 filter paper | 112 | 24 |

We claim:

1. A method for making thermally stable, high-surface-area, metal oxide materials, the steps of the method comprising:
absorbing a liquid solution of metal oxide precursors which are selected from the group consisting of water soluble salts of a metal and which are capable of being converted to the metal oxide upon heating, onto a crystalline or microcrystalline, porous structured organic templating material capable of being combusted at elevated temperatures and being cellulose materials having an average pore volume in the mesoporous range selected from the group consisting of filter paper, chromatography paper and microcrystalline cellulose powder;
heating said organic templating material containing said absorbed liquid solution to vaporize the liquid, convert said metal oxide precursors to metal oxides, and combust said organic templating material.

2. The method of claim 1 wherein said organic templating material combusts at temperatures between about 500° C. and 1000° C.

3. The method of claim 1 wherein said organic templating material containing said absorbed solution is heated at a temperature of no more than about 100° C. to vaporize said liquid.

4. The method of claim 1 wherein said liquid is water.

5. The method of claim 1 wherein said salts are selected from the group consisting of nitrates, citrates, acetylacetonates, and mixtures thereof.

6. The method of claim 1 wherein said absorbing step comprises providing solution only to completely fill the pores of said organic templating material.

7. The method according to claim 1 wherein said metal is selected from the group consisting of cerium, zirconium, praseodymium, alkaline earth elements, transition metals, the lanthanide series, and mixtures of any of them.

8. The method according to claim 1 having the further step of depositing noble metal onto said metal oxide.

9. Metal oxide materials according to claim 1 made from the group consisting of cerium, zirconium, praseodymium, or mixtures of any of them, which retain BET surface area in excess of 55 $m^2/g$ after air-calcination for 2 hours at 800° C. and in excess of 15 $m^2/g$ after air-calcination for 12 hours at 1050° C.

10. A method for making thermally-stable, high-surface-area, metal oxide materials, the steps of the method comprising:
absorbing an aqueous solution of metal oxide precursors, selected from the group consisting of water soluble salts of a metal, onto a crystalline or microcrystalline, porous structured organic templating material selected from cellulose materials having average pore size in the mesoporous range and being selected from the group consisting of filter paper, chromatography paper, and micro-crystalline cellulose powder being combustible at temperatures between about 500 and 1000° C.;
heating said organic material containing said absorbed solution for a time and at a temperature sufficient to vaporize the water, convert said metal oxide precursors to metal oxides and combust said organic templating material.

* * * * *